United States Patent Office 3,369,030
Patented Feb. 13, 1968

3,369,030
ETHYLENICALLY UNSATURATED
AZIDOFORMATES
Norman C. MacArthur, Avondale, Pa., assignor to Hercules Incorporated, Wilmington, Del., a corporation of Delaware
No Drawing. Continuation-in-part of applications Ser. No. 417,469, Dec. 10, 1964, and Ser. No. 475,232, July 27, 1965. This application Nov. 22, 1966, Ser. No. 596,053
6 Claims. (Cl. 260—349)

ABSTRACT OF THE DISCLOSURE

Ethylenically unsaturated compounds containing 1–5 azidoformate groups, such as the monoazidoformate of the triallyl ether of pentaerythritol, the monoazidoformate of 2-hydroxyethyl methacrylate, and oleyl azidoformate, are described. These compounds are useful in film-forming compositions, as tire cord adhesives, and can be homopolymerized and copolymerized.

---

This application is a continuation-in-part of my application Ser. No. 417,469, filed Dec. 10, 1964, now abandoned, and of my application Ser. No. 475,232, filed July 27, 1965.

This invention relates to azidoformates and, more particularly, to azidoformates containing at least one ethylenically unsaturated group.

The azidoformates of this invention are compounds having the formula

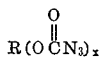

where R is an organic radical containing ethylenic unsaturation and $x$ is a number from 1 to 5, and preferably from 1 to 3. The ethylenically unsaturated group contained in R preferably has at least one hydrogen atom attached to a carbon atom alpha to the ethylenic unsaturation. This unsaturated group can be a vinylidene group ($H_2C=C<$), such as occurs where R is vinyl, vinylalkyl (such as allyl, 3-butenyl, 4-pentenyl, 2-methyl-3-butenyl, 2-chloromethyl-3-butenyl, etc.), vinylcycloalkyl (such as 4-vinylcyclohexyl) or vinylaryl (for example, o-, m- and p-vinylphenyl and 2-vinylnaphthyl, and halo- or alkyl ring substituted derivatives thereof such as vinylchlorophenyl), and other vinylidene groups such as where R is methallyl, 2-ethylallyl, 3-methyl-3-butenyl, 2,3-dimethyl-3-butenyl, isopropenylphenyl, etc.; a vinylene group (—CH=CH—), such as where R is propenyl, 2-butenyl, 1-butenyl, 2-pentenyl, cyclohexenyl, dicyclopentadienyl, 2-phenylethenylene, and as found in the alkenyl fragments of such acids as oleic, linoleic, linolenic, licanic or eleostearic acids and the like; a substituted vinylene group of the formula —HC=C<, such as where R is 1-isobutenyl or 2-phenylpropenyl, etc.; a fully substituted vinylene group of the formula >C=C<, such as where R is 2,3-dimethyl-2-butenyl, 2,3-dimethyl-2-pentenyl, or 2,3-dimethyl-2-cyclohexenyl, etc.; or a radical of the formula (R′ O)$_n$Z, where R′ is R as defined above or is acrylyl or methacrylyl, Z is the inert residue of a saturated aliphatic alcohol having a minimum functionality of 2, and $n$ is the functionality of Z minus $x$ where $x$ is as defined above and $n$ is at least 1. Preferred alcohols from which Z can be derived include the dihydric alcohols such as ethylene glycol, tri-methylene glycol, and hexamethylene glycol; trihydric alcohols such as glycerol and the trimethylol alkanes such as trimethylol propane; tetrahydric alcohols such as pentaerythritol; and the like.

Exemplary of the ethylenically unsaturated azidoformates of this invention are azidoformates having the formulae:

(1)  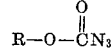

where R is an alkenyl, cycloalkenyl, alkenylaryl and alkenylcycloalkyl radical and contains 2 to 12 carbon atoms, as, for example, the monoazidoformate of allyl alcohol, the monoazidoformate of methallyl alcohol, oleyl azidoformate, linoleyl azidoformate, eleostearyl azidoformate, the monoazidoformate of o-, m-, and p-hydroxystyrene, the monoazidoformate of α-vinylbenzyl alcohol, the monoazidoformate of 4-vinylcyclohexanol, the monoazidoformate of cyclohexenyl alcohol, and the monoazidoformate of 2-vinyl-α-naphthol;

(2)  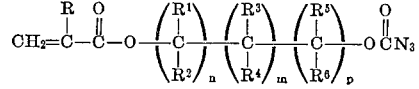

where R is hydrogen or methyl; $R^1$, $R^2$, $R^3$, $R^4$, $R^5$, and $R^6$ are each hydrogen or alkyl groups of 1 to 4 carbon atoms and may be alike or different; $n$, $m$, and $p$ are 0 to 6 and the sum of $n$, $m$, and $p$ is 2 to 6, as, for example, the monoazidoformate of 2-hydroxyethyl acrylate, the monoazidoformate of 3-hydroxy-n-propyl acrylate, the monoazidoformate of 2-hydroxy-n-propyl acrylate, the monoazidoformate of 4-hydroxybutyl acrylate, the monoazidoformate of 5-hydroxyamyl acrylate, the monoazidoformate of 6-hydroxyhexyl acrylate, the monoazidoformate of 2-hydroxyethyl methacrylate, the monoazidoformate of 3-hydroxy-n-propyl methacrylate, the monoazidoformate of 2-hydroxy-n-propyl methacrylate, the monoazidoformate of 4-hydroxybutyl methacrylate, the monoazidoformate of 5-hydroxyamyl methacrylate, and the monoazidoformate of 6-hydroxyhexyl methacrylate;

(3)  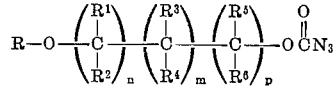

where R is an alkenyl radical containing 2 to 4 carbon atoms or an alkenoyl radical containing 2 to 18 carbon atoms; $R^1$, $R^2$, $R^3$, $R^4$, $R^5$, and $R^6$ are each hydrogen, alkyl (e.g., methyl and ethyl), methylol,

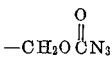

or —$CH_2O$—Y where Y is an alkanoyl or alkenoyl radical containing 3 to 18 carbon atoms; and $n$, $m$, and $p$ are 0 to 6 and the sum of $n$, $m$, and $p$ is 2 to 6; as, for example, the monoazidoformate of pentaerythritol dioleate, the bisazidoformate of pentaerythritol dioleate, the monoazidoformate of ethylene glycol monovinyl ether, the monoazidoformate of propylene glycol monovinyl ether, the monoazidoformate of butanediol monovinyl ether, the monoazidoformate of hexylene glycol monovinyl ether, the monoazidoformate of the allyl ether of ethylene glycol, the monoazidoformate of the allyl ether of 1,3-propylene glycol, the monoazidoformate of the monovinyl ether of 1,2-propylene glycol, the monoazidoformate of the allyl ether of 1,4-butanediol, the monoazidoformate of the monovinyl ether of 1,2-butanediol, the monoazidoformate of the monovinyl ether of 1,3-butanediol, the monoazidoformate of the monovinyl ether of 2,3-butanediol, the monoazidoformate of the allyl ether of hexylene glycol, the monoazidoformate of the allyl ether of glycerol, the monoazidoformate of the methallyl ether of ethylene glycol, the monoazidoformate of the monoallyl ether of trimethylol ethane, the monoazidoformate of the monoallyl ether of trimethylol propane, the monoazidoformate of the monoallyl ether of pentaerythritol, the monoazidoformate of the diallyl ether of glycerol, the monoazidoformate of the diallyl ether of trimethylol ethane, the monoazidoformate of the diallyl ether of trimethylol propane, the monoazidoformate of the diallyl ether of pentaerythritol, the monoazidoformate of the triallyl ether of pentaerythritol, the bisazidoformate of the diallyl ether of pentaerythritol, and the trisazidoformate of the allyl ether of pentaerythritol;

(4)

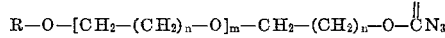

where R is an alkenyl radical containing 2 to 4 carbon atoms, $n$ is 1 to 2, and $m$ is at least 1, as, for example, the monoazidoformate of diethylene glycol monovinyl ether, the monoazidoformate of triethylene glycol monovinyl ether, and the monoazidoformates of other polyethylene glycol monovinyl ethers; and (5) other aziodoformates such as the monoazidoformate of 2-vinyl-5,5-bis(hydroxymethyl)-1,3-dioxane, the monoazidoformate of the allyl ether of butenediol, the trisazidoformate of dipentaerythritol tritungate, the trisazidoformate of the monoallyl ether of dipentaerythritol, the trisazidoformate of the diallyl ether of dipentaerythritol, the trisazidoformate of the triallyl ether of dipentaerythritol, the tetrakisazidoformate of the monoallyl ether of dipentaerythritol, the tetrakisazidoformate of the diallyl ether of dipentaerythritol, the pentakisazidoformate of the monoallyl ether of dipentaerythritol, the polyazidoformates of the vinyl or allyl ethers of mannitol, and the like.

The azidoformates of this invention can be prepared in various ways, as, for example, by reacting a compound containing at least one ethylenic double bond, having at least one hydrogen on a carbon alpha thereto, and at least one reactive hydroxyl group, with phosgene, and then reacting the chloroformate resulting from that reaction with an excess, i.e., from about 1.05 moles to about 10 moles per equivalent of chloroformate of an alkali azide. These reactions are illustrated by the following equations:

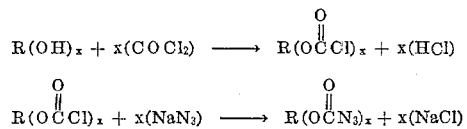

where R and $x$ are as defined above. Exemplary of compounds containing at least one ethylenic double bond with hydrogen alpha thereto and at least one reactive hydroxyl group which can be used to form the azidoformates of this invention are allyl alcohol; hydroxyalkyl acrylates such as hydroxyethyl acrylate, hydroxypropyl acrylate, and the like; hydroxyalkyl methacrylates such as hydroxyethyl methacrylate, hydroxypropyl methacrylate, and the like; alcohols derived from long chain unsaturated acids such as oleyl alcohol, linoleyl alcohol, and eleostearyl alcohol, and the like; partial esters of unsaturated acids and polyols such as pentaerythritol dioleate and the like, and alcohols derived from and partial esters of polyols with the mixtures of unsaturated fatty acids obtained from naturally occurring oils such as tung oil, linseed oil, soybean oil, cottonseed oil, and the like; the monovinyl ethers of glycols such as ethylene glycol monovinyl ether, propylene glycol monovinyl ether, butanediol monovinyl ether, diethylene glycol monovinyl ether and hexylene glycol monovinyl ether; the allyl ethers of glycols such as the allyl ether of ethylene glycol, the allyl ether of propylene glycol, the allyl ether of butanediol, the allyl ether of butenediol, and the allyl ether of hexylene glycol; the monoallyl ether of glycerine; the monoallyl ethers of trimethylolalkanes such as the monoallyl ether of trimethylolethane, the monoallyl ether of trimethylolpropane, the monoallyl ether of pentaerythritol; the monoacetals of acrolein and pentaerythritol such as 2-vinyl-5,5-bis(hydroxymethyl)-1,3-dioxane; the o-, m-, and p-hydroxystyrenes; ring substituted derivatives of the hydroxystyrenes; and the like. The diallyl ethers of trihydric alcohols, such as glycerine, trimethylolethane and trimethylolpropane, mixtures thereof with the corresponding monoallyl ethers and the di- and triallyl ethers of pentaerythritol, as well as mixtures thereof with each other and with the monoallyl ethers, are also suitable.

Before describing the invention in greater detail, the following examples are presented to illustrate the preparation of the new azidoformates. All parts and percentages in these and all the other examples set forth herein are by weight unless otherwise indicated.

*Example 1*

To a slurry of 346 parts of phosgene, 140 parts of calcium carbonate and 668 parts of methylene chloride maintained at −10° C. were added dropwise over 45 minutes 325 parts of 2-hydroxyethyl methacrylate, and the reaction mixture was agitated for 1.5 hours at 0° C. and then was sparged with nitrogen for 1 hour. The resulting chloroformate was aspirated under vacuum for 1 hour and then was filtered while still cold. The solid was washed with methylene chloride and the filtrate and washings were concentrated under vacuum to give 266 parts (55% yield) of chloroformate as a yellowish oil.

To a slurry of 192 parts of sodium azide in 500 parts of water was added dropwise with agitation the above chloroformate dissolved in 1000 parts of methylene chloride. The reaction mixture was agitated and maintained at room temperature for 45 hours. Then the methylene chloride layer was separated and washed several times with water to remove any water-soluble impurities and was dried over sodium sulfate. The azidoformate product was isolated by removing the methylene chloride under vacuum. The monoazidoformate of 2-hydroxyethyl methacrylate, which was obtained as a straw-colored oil (240 parts; 87% yield based on the chloroformate), showed by infrared analysis 100% of the theoretical amount of unsaturation present and 84% of the theoretical azidoformate groups present.

*Example 2*

To a slurry of 223 parts of phosgene, 100 parts of calcium carbonate and 400 parts of methylene chloride maintained at −10° C., 384 parts of commercial triallyl ether of pentaerythritol, having an average degree of substitution greater than about 2.8, were added dropwise over 1.5 hours, and the reaction mixture was agitated for an additional 3.5 hours. Excess phosgene was sparged from the reaction mixture with nitrogen, the reaction mixture was then filtered to remove salts, and the filtrate was aspirated under vacuum to remove the methylene chloride and give 446 parts (93% yield) of the chloroformate of triallyl ether of pentaerythritol as an oil.

To a slurry of 216 parts of sodium azide in 400 parts of water was added dropwise with agitation 440 parts of the above chloroformate dissolved in 400 parts of methylene chloride. The reaction mixture was agitated vigorously, was maintained at room temperature for approximately 3 days, and then was refluxed for 5 hours. The methylene chloride layer was next separated, was washed several times with water to remove any water-soluble impurities, and then was dried. The product, the monoazidoformate of the triallyl ether of pentaerythritol, was isolated as a deep yellow oil in 81% yield, the oil containing 0.383 gram of solid per cubic centimeter. Analysis for hydroxyl, terminal methylene, azide groups, total nitrogen, and chlorine gave the following percentage values, as compared with the theoretical values:

Found: OH, 0.2%; $CH_2$, 11.5%; $N_3$, 11.1%; nitrogen, 10.0%; chlorine, nil. Calculated for $C_{15}H_{23}O_5N_3$: OH, 0%; $CH_2$, 12.9%; $N_3$, 12.9%; nitrogen, 12.9%; chlorine, 0%.

Example 3

To a slurry of 0.4 mole of phosgene maintained at −10° C. was added dropwise over a period of 20 minutes 0.2 mole of oleyl alcohol. This mixture was stirred at 0° C. for an additional 6 hours, after which time the reaction mixture was sparged with nitrogen and placed under a reduced pressure to remove the excess phosgene. The resulting product was 66 parts of oleyl chloroformate in the form of a clear oil.

A solution of 60 parts of the above oleyl chloroformate in 200 parts by volume of methylene chloride was stirred rapidly with a solution of 35.5 parts of sodium azide and 80 parts of water. This stirring was continued for 5 days at room temperature, and the organic layer was then separated, washed with water, and dried over sodium sulfate. The resulting product was filtered, washed with methylene chloride, and yielded 325 parts by volume of a solution of oleyl azidoformate. A portion of the solvent was removed, leaving the azidoformate in the form of a yellow oil. Analysis of the product for hydroxyl, nitrogen, and unsaturation content was as follows:

Found: OH, <0.04%; nitrogen, 11.1%; —HC=CH—, 7.6%. Theoretical content of oleyl azidoformate: OH, 0%; nitrogen, 12.5%; —HC=CH—, 7.7%.

Example 4

A flask containing 84.2 parts of tung oil acids was flushed with carbon dioxide and then arranged so that a slow stream of carbon dioxide gas moved continuously through the apparatus. The tung oil acids were then heated to a temperature of 200° C., with stirring, over a period of about one-half hour, and 25.4 parts of dipentaerythritol were added thereto slowly in the absence of air. A clear, amber solution resulted, which was held at 200° C., with stirring, until its acid number was less than 5 (about 2–3 hours). The resulting product was a viscous liquid with an average of 3 hydroxyl groups per mole. This product was cooled to −10° C. and maintained at that temperature while 60 parts of phosgene was added thereto in small amounts over a period of 30–45 minutes. The temperature of the reaction mixture was then raised to 0° C. and the product was stirred for 6 hours, after which it was allowed to warm to room temperature. The excess phosgene was allowed to escape the reaction mixture during this warming. The resulting product was the chloroformate of dipentaerythritol tritungate. This chloroformate was dissolved in 300 parts by volume of methylene chloride and was then stirred with a solution of 38.4 parts of sodium azide in 90 parts of water for 5 days at room temperature. The organic layer was then separated, washed with water, and dried over sodium sulfate. The resulting product analyzed on the average for the trisazidoformate of dipentaerythritol tritungate.

Example 5

The general procedure of Example 1 was repeated except that in this example 132 parts of diethylene glycol monovinyl ether was added dropwise, with stirring, over a period of 1 hour to a slurry of 147 parts of phosgene, 55 parts of calcium carbonate, and 280 parts of methylene chloride, and 116 parts (60% yield) of the chloroformate was obtained as a yellowish oil. The above chloroformate, dissolved in 450 parts of methylene chloride, was next added dropwise with agitation to a slurry of 77 parts of sodium azide in 200 parts of water and the agitation continued for 24 hours at room temperature. The azidoformate product was then separated, dried, and isolated according to the procedure of Example 1. The monoazidoformate of diethylene glycol monovinyl ether which was obtained as a straw-colored oil (171 parts; 85% yield based on the chloroformate) was confirmed by an infrared spectrum which showed strong absorption at 2140 cm.$^{-1}$.

Since the azidoformates of this invention are monomers which contain ethylenic unsaturation, they can be converted into homopolymers ranging from low to high molecular weight polymers by polymerizing the monomer under conditions which do not destroy the azidoformate grouping, usually using conventional redox catalysts, such as cobalt-cyclohexanone peroxide or iron-benzoin-cumene hydroperoxide at room temperature, or such free radical initiators as acetyl peroxide, azobisisobutyronitrile, benzoyl peroxide, and the like, between room temperature and about 100° C. Preferably, the homopolymers comprise from 10 to 1000, and most preferably from 100 to 500 repeating units of the monomer.

The following example illustrates the preparation of a homopolymer of the azidoformate of 2-hydroxyethyl methacrylate. The molecular weight of the homopolymer is shown by the reduced specific viscosity (RSV), by which is meant the $\eta$sp/C determined on a 0.1% solution of the polymer in a given solvent at a given temperature.

Example 6

A polymerization tube was charged with 25 parts of an ethylene dichloride solution containing 2.45 parts of the azidoformate of 2-hydroxyethyl methacrylate prepared in Example 1 and 0.12 part of benzoyl peroxide. The tube was capped, and then was evacuated and filled 3 times with nitrogen. Hypodermic needles were inserted into the tube so that a stream of nitrogen could be passed into and out of the tube continuously. The tube and contents were then heated to 70° C. and held there with agitation for 3 hours, after which the solution was permitted to cool to room temperature overnight. The cooled solution was added dropwise to 8 to 10 volumes of stirred hexane to precipitate the polymer and the polymer was collected and dried for 3 hours in vacuo at 30° C. The polymeric monoazidoformate of 2-hydroxyethyl methacrylate was recovered in 51% conversion, had an RSV of 0.14 as determined in ethylene dichloride at 25° C., and on analysis contained 18.88% nitrogen (calculated for $C_7H_9O_4N_3$, 20.6%) after correction for purity of the monomer.

The azidoformates of this invention can also be converted into copolymers having molecular weights ranging from low to high by polymerizing a mixture of the azidoformate and at least one other ethylenically unsaturated monomer under conditions which do not destroy the azidoformate grouping using, if desired, conventional redox catalysts or free radical initiators. Thus, compounds containing at least one vinyl, vinylidene, or vinylene group ordinarily can be copolymerized with the azidoformate. Suitable monomers include, for example, olefins such as ethylene, trichloroethylene, 1,2-dichloropropene-2; vinyl nitriles such as acrylonitrile and methacrylonitrile; vinyl esters such as vinyl acetate, vinyl carbazole, vinyl chloride, vinylidene chloride, allyl acetate, allyl chloride, allyl chloroacetate, methallyl acetate, methallyl chloride, isopropenyl acetate; diolefins such as butadiene and chloroprene; alkenylaryls such as styrene, the methylstyrenes, o-, m-, or p-chlorostyrene, 2,5-dichlorostyrene, pentachlorostyrene, m- or p-bromostyrene, p-iodostyrene, p-cyanostyrene, p-methoxystyrene, and p-dimethylaminostyrene; diethyl fumarate; diethyl maleate; maleic anhydride; the alkyl acrylates such as methyl acrylate and the higher alkyl esters, isobornyl acrylate; the α-chloroacrylates such as methyl α-chloroacrylate and the higher alkyl esters, β-chloroethyl acrylate; the methacrylates such as methyl methacrylate and the higher alkyl esters, isobornyl methacrylate; methyl vinyl ketone; 2-vinylpyridine; and the like, as well as an azidoformate of this invention which is different from the other azidoformate.

The following examples illustrate the preparation of azidoformate copolymers using either the azidoformate of 2-hydroxyethyl methacrylate prepared in Example 1 or the azidoformate of the triallyl ether of pentaerythritol prepared in Example 2. The molecular weight of the copolymers is shown by the reduced specific viscosity, as defined above.

*Example 7*

Into a reaction vessel charged with:

| | Parts by weight |
|---|---|
| α-Methylstyrene | 78 |
| Ethyl acrylate | 21 |
| Azidoformate of 2-hydroxyethyl methacrylate (dissolved in methylene dichloride) | 5 |
| Water | 200 |
| Sodium lauryl sulfate | 6 |
| $FeSO_4 \cdot 7H_2O$ | 0.020 |
| Sodium ethylenediamine tetraacetate | 0.029 |
| Sodium formaldehyde sulfoxylate | 0.36 |
| tert-Dodecyl mercaptan | 0.1 | and flushed 3 times with nitrogen, there was injected 0.13 part by volume of a 56% solution of p-menthane hydroperoxide. The mixture was agitated at 25° C. for 3 hours under nitrogen, and then was shortstopped by adding 9 parts of a 3% solution of 2,5-di-tert-amylhydroquinone in benzene. The polymeric latex was coagulated by adding it dropwise to 10 volumes of methanol, and then the coagulum was collected and was dissolved in sufficient toluene to give approximately 10% solids. The solution was filtered and the filtrate was added dropwise to 10 volumes of stirred methanol to reprecipitate the polymer. The product was collected and air-dried for 72 hours, giving a terpolymer of α-methylstyrene, ethyl acrylate, and the azidoformate of 2-hydroxyethyl methacrylate which weighed 31 grams, contained 1.2% nitrogen, and had an RSV of 1.2 determined in ethylene dichloride at 25° C.

*Example 8*

A polymerization tube was charged with 10 parts of butyl methacrylate, 0.5 part of the azidoformate of the triallyl ether of pentaerythritol (dissolved in 1.6 parts of ethylene dichloride), 20 parts of benzene and 0.03 part of α,α'-azobis(isobutyronitrile). A magnetic stirring bar was inserted into the tube and the tube was closed and was flushed 3 times with nitrogen. The charge was then heated, with stirring, and maintained at 65° C. for 4 hours. Total solids determination based on the cooled solution indicated 50% conversion to copolymer. The isolated product, a copolymer of butyl methacrylate, and the azidoformate of the triallyl ether of pentaerythritol, had an RSV of 0.3 determined in ethylene dichloride at 25° C. and contained 0.3% nitrogen.

As was mentioned above, the azidoformates of this invention are useful in coating compositions. They can be used as such with conventional film-forming compositions or can be homopolymerized or copolymerized with at least one other monomer as demonstrated above and used either alone as the essential film-forming ingredient or in combination with other polymeric film-forming materials. In either case, the azidoformates can be incorporated with the other coating ingredients in any desired fashion. For example, they can be uniformly blended with the other ingredients by simply milling on a conventional rubber mill at temperatures below which any appreciable decomposition of the azidoformate occurs, or they can be dissolved in a solution of the other ingredients. By either means, the azidoformate is distributed throughout the composition. The azidoformate can also be applied as a coating to a substrate and then topcoated with a conventional polymeric coating composition. Other means of intimately associating the azidoformate with the other coating ingredients will be apparent to those skilled in the art.

The azidoformates of the present invention are particularly useful with such film-forming polymers as the hydrocarbon polymers such as polyethylene, polypropylene, polystyrene, styrene-butadiene rubber, butyl rubber, natural rubber, polyisobutylene, ethylene-propylene copolymer, cis-1,4-polyisoprene, ethylene-propylene-dicyclopentadiene terpolymers, and the like, as well as the nonhydrocarbon polymers such as sulfochlorinated polyethylene, poly(vinyl acetate), poly(vinyl chloride), poly(vinylidene chloride), poly(ethylene oxide), poly[3,3-bis-(chloromethyl) oxetane], butadiene-acrylonitrile copolymer, etc., and blends of these polymers with each other or hydrocarbon polymers.

Coating compositions containing the azidoformates can be applied to the substrate in any desired fashion, as, for example, by coating the substrate with a dispersion or solution of the coating in a suitable diluent using conventional techniques. No matter how the azidoformate is associated with other polymeric film-forming materials and/or the substrate, upon subsequent heating to a temperature above the decomposition point of the azidoformate, modification is effected at the interfaces of the azidoformate and the other materials and improved adhesion results. The temperature, which is above the decomposition temperature of the azidoformate and to which the azidoformate-containing coatings can be heated, varies over a wide range, but, in general, will be in the range of from about 70° C. to about 350° C. Various amounts of the azidoformate can be used, the optimum amount depending upon the amount of modification desired, the specific azidoformate compound employed, etc. For example, in some cases, such as in certain film applications, it may be desirable to merely add a sufficient amount of azidoformate to improve adhesion without materially affecting its solubility. In general, the amount added, based on the weight of the coating, will be from about 0.01% to about 20%.

The following examples are presented to illustrate the use of the new azidoformates in adhering coatings.

*Examples 9–13*

Various coating formulations were prepared by physically mixing 100 parts of stereoregular polypropylene having a birefringent melting point of 168° C. and an RSV of 2 to 3 measured in decahydronaphthalene at 135° C., 100 to 200 parts of a hydrocarbon mixture boiling in the range of 180 to 265° C., 0.5 part of the reaction product of 1 mole of crotonaldehyde and 3 moles of 3-methyl-6-tert-butylphenol and 0.25 part of dilaurylthiodipropionate with from 0 to 5 parts (solids basis) of the azidoformate of the triallyl ether of pentaerythritol prepared in Example 2. Coatings (final thickness of 0.7 mil) were cast from these formulations onto phosphated steel panels using a 5-mil knife, and the coatings were fused, while wet, at about 210° C. for 5 minutes, were quenched, and then were tested for adhesion. Crosshatch-adhesion of the coatings to the panels was evaluated by crosshatching a 1-square-inch area of the surface of a coated panel with razor blade cuts 1/16 inch apart and at right angles to each other, applying a strip of conventional transparent pressure-sensitive "cellophane" tape over the crosshatched area with sufficient pressure to assure complete adhesion, jerking the tape from the surface, and observing what part, if any, of the coating was removed by the tape. In this test, a rating of "good" was assigned if no coating was stripped from the panel; a rating of "fair" if less than 25% of the coating was stripped; a rating of "poor" if more than 25% but not all of the coating was stripped; and a rating of "very poor" if all of the coating was stripped from the panel. Peel adhesion was evaluated by making parallel cuts ½-inch apart through the coating to the panel, making a single cut at right angles to the parallel cuts, and then manually lifting and peeling the coating from the panel. Adhesion was rated "good" if the coating peeled with stretching or breaking, "fair" if it peeled with some noticeable resistance, and "poor" if it peeled without noticeable effort. The amount of azidoformate in each formulation and the results of the adhesion tests for each are recorded below in Table I.

TABLE I

| Example No. | Azidoformate (parts by weight) | Adhesion | |
|---|---|---|---|
| | | Crosshatch | Peel |
| 9 | | Poor | Poor. |
| 10 | 0.5 | Good | Good. |
| 11 | 1.0 | ----do---- | Do. |
| 12 | 2.5 | ----do---- | Do. |
| 13 | 5.0 | ----do---- | Do. |

The procedure of Examples 10–13 was repeated except that unmodified triallyl ether of pentaerythritol was substituted for the azidoformate. In each case, the adhesion of the coating to the panel, as determined by the crosshatch and peel tests, was poor.

*Example 14*

A portion of the solution of the monoazidoformate of the triallyl ether of pentaerythritol prepared in Example 2 was diluted to 10% solids with xylene and was sprayed as a primer coating on phosphated steel panels. The sprayed panels were air-dried for 10 to 15 minutes and then were topcoated by casting an organosol containing 100 parts of polypropylene having an RSV of 2.3 and a particle size of 30 to 50 microns, 0.5 part of the reaction product of 1 mole of crotonaldehyde and 3 moles of 3-methyl-6-tert-butylphenol and 0.25 part of dilaurylthiodipropionate dispersed in 100 to 200 parts of a hydrocarbon mixture boiling in the range of 180 to 265° C. The panels were then baked for 5 minutes at 210° C. and quenched. The cross-hatch and peel adhesion of the coatings to the panels of this example were rated as good whereas control panels prepared in the same manner, except that the primer coating was omitted, were rated as poor. At the end of one week's aging at room temperature, the adhesion of the coatings to the panels was rechecked and found to be very good.

*Example 15*

A slurry was prepared from 100 parts of stereoregular polypropylene having a birefringent melting point of 168° C. and an RSV of 4 to 5 determined in decahydronaphthalene at 135° C., 267 parts of methylene dichloride and 5 parts (solids basis) of the monoazidoformate of the triallyl ether of pentaerythritol prepared in Example 2. The slurry was stripped of solvent at 25° C. under vacuum and then was heated for 45 minutes at 155° C. to decompose the azidoformate. Next, 0.5 part of the reaction product of 1 mole crotonaldehyde and 3 moles of 3-methyl-6-tert-butylphenol and 0.25 part of dilaurylthiodipropionate dissolved in 10 parts of acetone were slurried with the modified polymer, the acetone was stripped off under vacuum at room temperature, and the modified polymer was dried at room temperature overnight. The modified polymer was formed into an organosol by slurrying 100 parts of the polymer with 100 to 200 parts of a hydrocarbon mixture boiling in the range of 180 to 265° C. and the organosol was applied as a coating to steel panels which were then baked as in Example 14. The coatings adhered well, whereas control coatings of an organosol prepared in the same manner as above, except that polypropylene which had not been treated with the azidoformate was used in place of the modified polypropylene, adhered poorly to steel, thus again demonstrating the ability of the azidoformate to improve substantially the adhesion of coatings to substrates.

*Example 16*

A 20% xylene solution of the homopolymer of the azidoformate of 2-hydroxyethyl methacrylate prepared in Example 6 was cast as a coating onto 4 x 6-inch glass panels with a 5-mil blade, the coating was air-dried for 15 minutes, and then the dried coating was baked at 150° C. for 30 minutes. The coating was hard and brittle, adhered well to the glass, and was not affected by 30-minute immersion in xylene, indicating that the polymer was cross-linked.

*Example 17*

A 20% xylene solution of the terpolymer of α-methylstyrene, ethyl acrylate, and the azidoformate of 2-hydroxyethyl methacrylate prepared in Example 7 was cast onto 4 x 6-inch bonderized steel panels using a 20-mil blade. The coated panels were air-dried for 15 minutes and then the dried panels were baked for 1 hour at 149° C. The coating was 1.4 mils thick, had a Sward hardness of 40, was essentially insoluble in xylene, and adhered well to the panels. A similar coating of a control polymer of α-methylstyrene and ethyl acrylate prepared as in Example 7, except that the azidoformate was omitted, dissolved readily in xylene.

*Example 18*

The coating solution of Example 17 was cast with a 3-mil blade onto a portion of a 5 x 5 x ⅛-inch polypropylene plaque which had been solvent treated by subjecting the surface to be coated to the hot vapors of refluxing trichloroethylene for about 5 seconds. Another portion of the same plaque was similarly coated except that a solution of the control polymer of Example 17 was used instead of the terpolymer. The plaque was baked for 1 hour at 150° C. and the crosshatch adhesion of the coatings to the plaque determined as in Examples 9–13. None of the coating of the terpolymer of α-methylstyrene, ethyl acrylate and the azidoformate of 2-hydroxyethyl methacrylate was removed from the plaque by the tape when tested immediately after removal from the oven, warm, or at room temperature, whereas about 90% of the coating of the control polymer of α-methylstyrene and ethyl acrylate was stripped from the plaque when tested hot from the oven, about 10 to 20% removed when warm, and a slight amount removed at room temperature.

*Example 19*

A portion of the solution of the copolymer of butyl methacrylate and the azidoformate of the triallyl ether of pentaerythritol prepared in Example 8 was knife-cast as a coating on phosphated steel panels and the coating was baked for 30 minutes at 120° C. The coating was insoluble in xylene, indicating that the copolymer was cross-linked.

The azidoformates of this invention are also useful for coating fibers to improve their adhesion to rubber, as, for example, for the treatment of polyester tire cord. Coating compositions containing the azidoformates can be applied to the surface of the fiber by conventional means, for example, by dipping, spraying, brushing, or running the fiber over a coated roll with a dispersion or solution of the azidoformate in a suitable diluent. Any inert organic diluent or water can be used. After the azidoformate is applied to the substrate, the coated substrate is heated to a temperature above the decomposition point of the azidoformate, resulting in modification of the fibrous substrate at the azidoformate substrate interfaces. The decomposition temperature of the azidoformate, to which the azidoformate coated substrates are heated, varies over a wide range. However, this temperature, which is termed the "curing temperature" is generally from about 70° C. to about 350° C. for a sufficient time to allow the desired degree of interaction between the azidoformate and the surface of the substrate to occur. Alternatively, the curing step can be deferred until the azidoformate-coated fiber or cord has been embedded in rubber. In such case, the azidoformate can be air-dried at room temperature and the interaction between the azidoformate and the substrate effected during vulcanization.

The direct vulcanization of rubber with modified polyester fiber or cord is illustrated by the following examples.

Examples 20–23

Samples of poly(ethylene terephthalate) tire cord were immersed for 5 minutes in a 20% methylene dichloride solution of the azidoformate of the triallyl ether of pentaerythritol prepared in Example 2, excess solution was drained from the cord, and the samples were dried under the following conditions:

| Example No. | Coating, Percent (Azidoformate add-on) | Drying Conditions |
|---|---|---|
| 20 | 15.8 | Air-dried. |
| 21 | 18.4 | Do. |
| 22 | 20.1 | 45 min. at 155° C. |
| 23 | 16.7 | Do. |

Each of the samples was then embedded in styrene-butadiene rubber stock and the rubber vulcanized for 30 minutes at 155° C. The degree of adhesion of the treated cord to the rubber stock was evaluated by pulling the cord from the vulcanized stock and observing the type of adhesive failure. The cords of Examples 20 to 23 were covered with rubber to the extent of at least 25%, indicating a significant amount of failure of the rubber-to-rubber bonds as compared with rubber-to-cord bonds. Poly(ethylene terephthalate) cord which had not been treated with the azidoformate was similarly incorporated in the rubber stock and vulcanized. The cord, after pulling from the vulcanized stock, had less than 10% rubber on its surfaces. These results indicate that the azidoformates improved the adhesion of rubber to poly(ethylene terepthalate) tire cord.

What I claim and desire to protect by Letters Patent is:

1. An azidoformate selected from the group consisting of (1)

where R is selected from the group consisting of alkenyl, cycloalkenyl, alkenylaryl, and alkenylcycloalkyl radicals containing 2 to 12 carbon atoms;

(2)
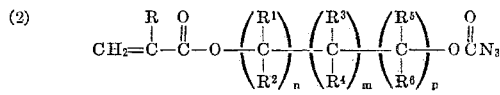

where R is selected form the group consisting of hydrogen and methyl; $R^1$, $R^2$, $R^3$, $R^4$, $R^5$, $R^6$ are selected from the group consisting of hydrogen and alkyl groups containing 1 to 4 carbon atoms; $n$, $m$, and $p$ are 0 to 6; and the sum of $n$, $m$, and $p$ is 2 to 6;

(3)
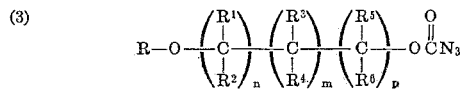

where R is selected from the group consisting of alkenyl radicals containing 2 to 4 carbon atoms and alkenoyl radicals containing 2 to 18 carbon atoms; $R^1$, $R^2$, $R^3$, $R^4$, $R^5$, and $R^6$ are selected from the group consisting of hydrogen, alkyl, methylol,

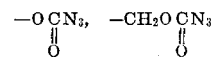

and —CH$_2$O—Y where Y is selected from the group consisting of alkanoyl and alkenoyl radicals containing 3 to 18 carbon atoms; and $n$, $m$, and $p$ are 0 to 6 and the sum of $n$, $m$, and $p$ is 2 to 6;

(4)
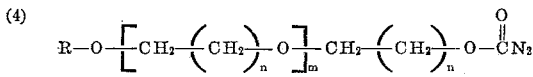

where R is an alkenyl radical containing 2 to 4 carbon atoms, $n$ is 1 to 2, and $m$ is a number which is at least 1; and (5) the monoazidoformate of 2-vinyl-5,5-bis(hydroxymethyl)-1,3-dioxane, the monoazidoformate of the allyl ether of butene diol, the trisazidoformate of dipentaerythritol tritungate, the trisazidoformate of the monoallyl ether of dipentaerythritol, the trisazidoformate of the diallyl ether of dipentaerythritol, the trisazidoformate of the triallyl ether of dipentaerythritol, the tetrakisazidoformate of the monoallyl ether of dispentaerythritol, the tetralkisazidoformate of the diallyl ether of dipentaerythritol, the pentakisazidoformate of the monoallyl ether of dipentaerythritol, the polyazidoformates of the vinyl ethers of mannitol or the polyazidoformates of the allyl ethers of mannitol.

2. The azidoformate of claim 1 which is the monoazidoformate of 2-hydroxyethyl methacrylate.

3. The azidoformate of claim 1 which is the monoazidoformate of the triallyl ether of pentaerythritol.

4. The azidoformate of claim 1 which is oleyl azidoformate.

5. The azidoformate of claim 1 which is the trisazidoformate of dipentaerythritol tritungate.

6. The azidoformate of claim 1 which is the monoazidoformate of diethylene glycol monovinyl ether.

References Cited

UNITED STATES PATENTS

| | | | |
|---|---|---|---|
| 3,211,677 | 10/1965 | Feild et al. | 260—349 X |
| 3,211,678 | 10/1965 | Robinson | 260—349 X |
| 3,211,752 | 10/1965 | Breslow | 260—349 |
| 3,284,421 | 11/1966 | Breslow | 260—349 X |

JOHN D. RANDOLPH, *Primary Examiner.*

WALTER A. MODANCE, *Examiner.*

JOHN M. FORD, *Assistant Examiner.*